US006939529B2

(12) United States Patent
Strizki et al.

(10) Patent No.: US 6,939,529 B2
(45) Date of Patent: Sep. 6, 2005

(54) SELF-REGULATING HYDROGEN GENERATOR

(75) Inventors: Michael Strizki, Hopewell, NJ (US); Shailesh Shah, Eatontown, NJ (US)

(73) Assignee: Millennium Cell, Inc., Eatontown, NJ (US)

( * ) Notice: Subject to any disclaimer, the term of this patent is extended or adjusted under 35 U.S.C. 154(b) by 256 days.

(21) Appl. No.: 10/264,302

(22) Filed: Oct. 3, 2002

(65) Prior Publication Data

US 2004/0067195 A1 Apr. 8, 2004

(51) Int. Cl.$^7$ .................................................. C01B 3/02

(52) U.S. Cl. .............................. 423/658.2; 423/648.1; 422/108; 422/198; 422/204; 422/211

(58) Field of Search ............................. 48/67; 422/198, 422/204, 211, 108; 423/648.1, 658, 658.2

(56) References Cited

U.S. PATENT DOCUMENTS

| | | | |
|---|---|---|---|
| 2,534,533 A | | 12/1950 | Schlesinger et al. |
| 3,210,157 A | | 10/1965 | Lewis, Jr. et al. |
| 3,459,510 A | * | 8/1969 | Litz et al. ................. 422/113 |
| 6,274,093 B1 | | 8/2001 | Long et al. |
| 6,358,488 B1 | | 3/2002 | Suda |
| 6,534,033 B1 | | 3/2003 | Amendola et al. |
| 2001/0022960 A1 | | 9/2001 | Kojima et al. |
| 2001/0045364 A1 | | 11/2001 | Hockaday et al. |
| 2002/0025462 A1 | | 2/2002 | Nakanishi et al. |
| 2003/0009942 A1 | | 1/2003 | Amendola et al. |
| 2003/0037487 A1 | | 2/2003 | Amendola et al. |
| 2004/0009379 A1 | | 1/2004 | Amendola et al. |
| 2004/0047801 A1 | | 3/2004 | Petillo et al. |

OTHER PUBLICATIONS

Maurice E. Indig and Richard N. Snyder, "Sodium Borohydride, An Interesting Anodic Fuel ", Journal of the Electrochemical Society, vol. 109, pp. 1104–1106, Nov. 1962.
C. A. MacCarley, "Development of a Sodium Borohydride Hydrogen Fuel Storage System for Vehicular Applications," UCLA School of Engineering and Applied Science, Symposium on Alternative Fuel Resources, Santa Monica, CA, Mar. 1976, pp. 315–321.
S. C. Amendola et al., "A safe, portable, hydrogen gas generator using aqueous borohydride solution and Ru catalyst," International Journal of Hydrogen Energy, 25, 2000, pp. 969–975.
S. C. Amendola et al., "An Ultrasafe Hydrogen Generator: aqueous, alkaline borohydride solutions and Ru catalyst," Journal of Power Sources, 85, 2000, pp. 186–189.
S. C. Amendola et al., "A Novel Catalytic Process for Generating Hydrogen Gas from Aqueous Borohydride Solutions," Advances in Hydroen Energy, Kluwer Academic/Plenum Publishers, 2000, pp. 69–86.

* cited by examiner

Primary Examiner—Stanley S. Silverman
Assistant Examiner—Maribel Medina
(74) Attorney, Agent, or Firm—Dickstein Shapiro Morin & Oshinsky LLP

(57) ABSTRACT

A hydrogen generating system regulates its rate of hydrogen generation by monitoring one or more parameters of the hydrogen generation process and then providing relative movement between the fuel tank and the catalyst chamber so as to increase or decrease the rate of hydrogen generation.

In the disclosed embodiments, the catalyst chamber is disposed in a tank containing the fuel. The relative movement provided moves the catalyst chamber toward the fuel solution so as to increase the rate of hydrogen generation and moves the catalyst chamber away from the fuel solution to decrease such generation. Advantageously, such self-regulation can be provided without an external power source and can be varied to meet the requirements of different commercial applications. The overall system can be readily fabricated using commercially available parts.

20 Claims, 4 Drawing Sheets

SELF-REGULATING HYDROGEN GENERATOR

TECHNICAL FIELD

The present invention relates to a hydrogen generating system and, more particularly, to such a system that is self-regulating and does not require any external power source to operate.

BACKGROUND OF THE INVENTION

The hydrolysis reactions of many complex metal hydrides, including sodium borohydride ($NaBH_4$), have been commonly used for the generation of hydrogen gas. The governing chemical reaction for such hydrolysis may be expressed as:

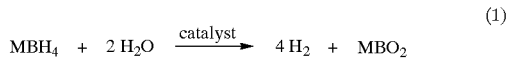

$$MBH_4 + 2H_2O \xrightarrow{catalyst} 4H_2 + MBO_2 \qquad (1)$$

where $MBH_4$ and $MBO_2$ respectively represent a metal borohydride and a metal metaborate. As the hydrolysis of sodium borohydride is typically slow at room temperature, heat or a catalyst, e.g., acids or a variety of transition metals, can be used to accelerate the hydrolysis reaction. The transition metals can include ruthenium, cobalt, nickel, or iron, or corresponding metal salts in solution or as solids, or metal borides as suspensions, or such salts, borides or metals can be deposited on inert supports. In addition, the rate of decomposition of the complex metal hydride into hydrogen gas and a metal metaborate is pH dependent, with higher pH values hindering the hydrolysis. Accordingly, solutions of a complex metal hydride (such as sodium borohydride), a stabilizer (such as sodium hydroxide (NaOH)), and water are used as the fuel from which the hydrogen gas is generated.

In those applications where a steady and constant supply of hydrogen is required, it is possible to construct hydrogen generation apparatus that controls the contact of a catalyst with the hydride fuel. Various hydrogen generation systems have been developed for the production of hydrogen gas from an aqueous sodium borohydride fuel solution (for example, U.S. patent application Ser. No. 09/900,625, "Portable Hydrogen Generator", filed Jul. 6, 2001 and U.S. patent application Ser. No. 09/902,899, "Differential Pressure-Driven Borohydride Based Generator", filed Jul. 11, 2001). These systems may be referred to as "two-tank" systems, where one tank is required for the storage of an aqueous metal borohydride solution and a separate tank is used to contain the discharged metal metaborate solution. A catalyst bed reactor connects the two tanks, and a fuel pump meters fuel solution to contact the catalyst bed. While these systems perform satisfactorily in many applications, they are larger than is desired for other applications and, in addition, require a source of power for the fuel pump.

A simple, one-tank recirculating system that uses pressure regulation is described in U.S. patent application Ser. No. 09/979,363, "A System for Hydrogen Generation," filed Jan. 7, 2000. In this system, the catalyst bed is fixed in place and the pressure produced by generated hydrogen causes the solution to be forced away from the catalyst, thereby slowing down the hydrogen generation process. The generator described in this reference must remain upright in order to operate and to prevent unwanted contact of the fuel with the catalyst. In addition, if the demand for hydrogen ceases, the generator must either be drained or remain pressurized in order to prevent the fuel solution from contacting the catalyst bed.

SUMMARY OF THE INVENTION

Broadly, pursuant to the present invention, a self-regulating hydrogen generating system is provided. More specifically, the hydrogen generation system in accordance with the present invention regulates the rate of hydrogen generation by providing relative movement between the fuel tank and the catalyst chamber so as to increase or decrease the hydrogen generation rate. This relative movement provided is in response to the monitoring of one or more parameters of the hydrogen generation process.

In the disclosed embodiments, the catalyst chamber is disposed in a tank containing the fuel. The relative movement provided moves the catalyst chamber toward the fuel solution so as to increase the rate of hydrogen generation and moves the catalyst chamber away from the fuel solution to decrease such generation. Advantageously, such self-regulation can be provided without an external power source in a compact fashion and can be varied to meet the requirements of different commercial applications. The overall system may use a single tank for the fuel and spent fuel solution, is compact and can be fabricated using commercially available parts.

DETAILED DESCRIPTION

Figure 1:
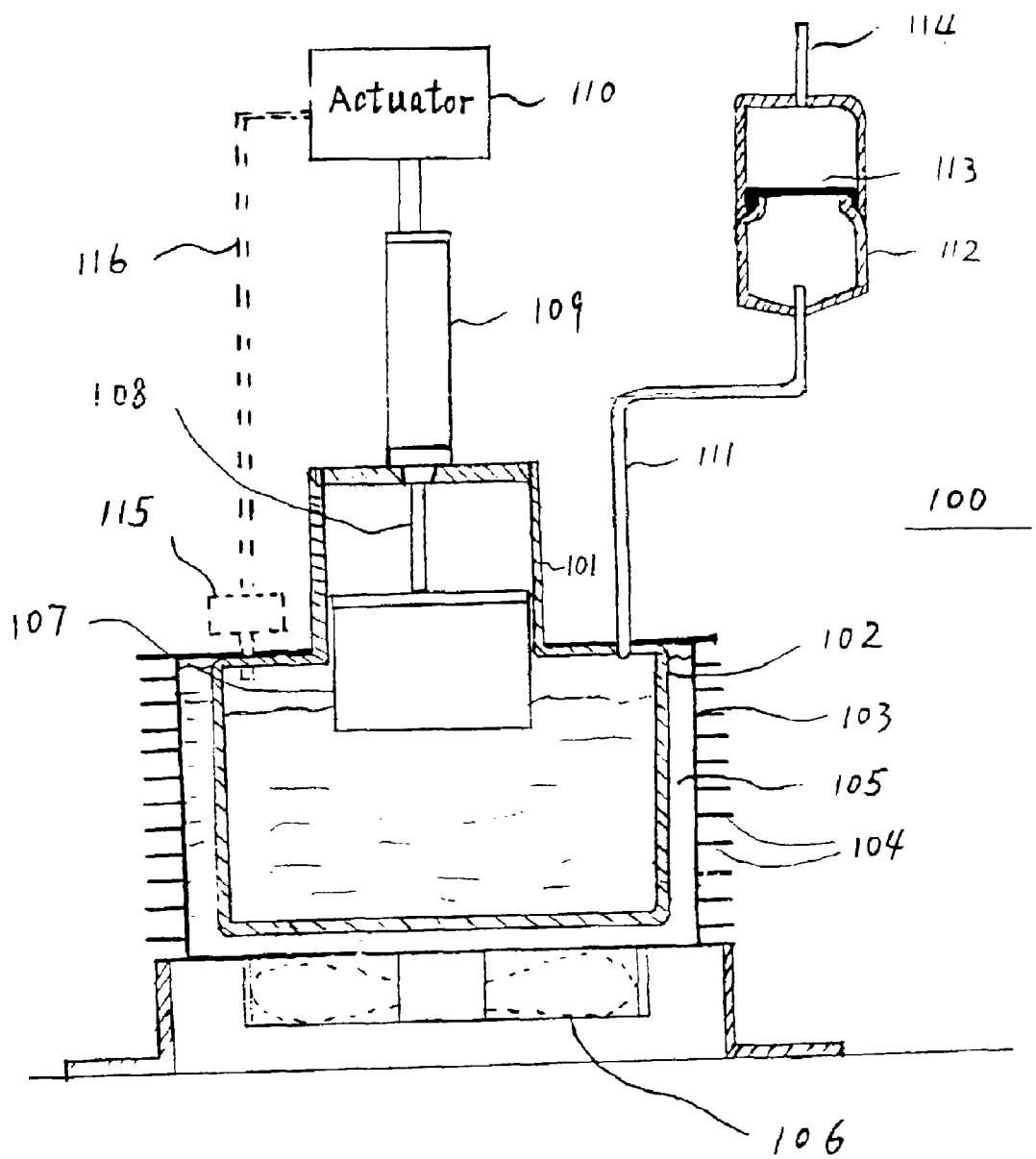
FIG. 1 is a preferred embodiment of a hydrogen generating system in accordance with the present invention.

Refer now to FIG. 1 which shows a portable, compact, self-regulating hydrogen generation system in accordance with the preferred embodiment of the present invention. System 100 includes a single fuel tank 101 for holding a fuel solution capable of generating hydrogen. This solution, for certain applications, also contains a stabilizer, such as sodium hydroxide. As the generation of hydrogen is an exothermic reaction, tank 101 is preferably a double-walled tank having inner wall 102 and outer wall 103 for those applications where a high rate of hydrogen generation is required. The space between walls 102 and 103 may be filled with material 105 having a high specific heat, e.g., water, which serves as a heat sink for the system. Such heat transfer is further enhanced by incorporating a plurality of fins in the tank's walls. The fins may be disposed in either one or both of the wall surfaces and may be in either one or both of the inner wall 102 and outer wall 103. As shown in FIG. 1, fins 104 protrude outwardly from wall 103. Alternatively, the material between walls 102 and 103 can be used for warming the fuel solution, using a heating element not shown, to permit system operation in low temperature environments, e.g., conditions below the freezing point of the solution (ca. 0° C.). Further enhancement of the heat transfer capabilities of system 100 may be provided through the use of a fan 106. This fan could be automated to turn on when the fuel solution reaches a pre-set temperature. For applications requiring either a low rate of hydrogen generation or conditions that will be above the freezing point of the fuel solution, some of these additional features may not be included.

The fuel solution in tank 101 includes one or more complex metal hydride having the general chemical formula $MBH_4$. M is an alkali metal selected from Group I (formerly Group 1A) of the periodic table, examples of which include lithium, sodium, or potassium. M may, in some cases, also be ammonium or organic groups. B is an element selected from group 13 (formerly Group IIIA) of the periodic table, examples of which include boron, aluminum, and gallium. H is hydrogen. In the illustrative embodiments to be described the complex metal hydride is sodium borohydride ($NaBH_4$). Examples of others can be used in accordance with the principles of the invention include, but are not limited to $LiBH_4$, $KBH_4$, $NH_4BH_4$, $(CH_3)_4NBH_4$, $NaAlH_4$, $NH_4BH_4$ $KAlH_4$, $NaGaH_4$, $LiGaH_4$, $KGaH_4$, and the combinations thereof. The fuel solution can be made as needed from liquid and dry components, the latter being in the form of a powder, pellets or granules. Indeed, such fabrication can be provided by dispensing mechanisms that may be part of or located proximate to the hydrogen generation system. See, for example, U.S. patent application Ser. No. 10/115,269, entitled "Method And System For Generating Hydrogen By Dispensing Solid And Liquid Fuel Components", filed Apr. 2, 2002, and assigned to the present assignee. Such application is incorporated herein by reference.

The use of sodium borohydride as a fuel component for hydrogen generation is particularly desirable for certain applications. It has been found that the hydrogen gas produced using sodium borohydride is typically of high purity with no carbon-containing impurities, and high humidity. Hydrogen produced by the hydrolysis of any chemical hydride will have similar characteristics. However, no carbon monoxide has been detected in gas streams produced by sodium borohydride. This is noteworthy because most fuels cells, notably PEM and alkaline fuel cells, require high quality hydrogen gas and carbon monoxide will poison the catalyst and eventually corrupt the fuel cell. Other methods of generating hydrogen, such as fuel reforming of hydrocarbons, provide a hydrogen gas stream containing carbon monoxide and further processing is then required to remove it. Carbon dioxide is also present in the hydrogen gas stream.

The hydrogen generated by system 100 is within the enclosure formed by walls 102 and is coupled via conduit 111 to separator 112. The hydrogen gas passes through membrane 113 within separator 112 but not any accompanying water and/or entrained borate. This membrane also separates any stabilizer, if present in the fuel solution, from the generated hydrogen gas. Separators having this removal capability are commercially available. Any material trapped by membrane 113 drips back into the enclosure formed by inner walls 102. Membrane 113 may be fabricated from any material that is known to be more permeable to hydrogen than water vapor. For example, hydrophobic membranes may be used, including those made of silicon rubber, or fluoropolymer membranes, or any of the common hydrogen-permeable metal membranes, such as palladium-gold alloys. The use of a fluoropolymer membrane is preferable. The hydrogen gas after passing through membrane 113 is coupled via output conduit 114 to a storage tank or hydrogen consuming load, such as a fuel cell or the like. While the use of separator 112 may be highly desirable in certain applications, it may be eliminated in those applications where the presence of moisture or small amounts of entrained borate or hydroxide in the generated hydrogen gas is not a problem.

Tank 101 incorporates a catalyst chamber 107 that moves in response to the movement of shaft 108. Shaft 108 is connected to the piston (not shown) within cylinder 109. This piston is displaced by the operation of an actuating mechanism. Actuator 110 may be any of a variety of well-known actuator mechanisms, including but not limited to springs, hydraulic pumps or motors. The actuator may be incorporated within cylinder 109 or, as shown in the drawing figures, may be external, but connected to cylinder 109. The use of springs is particularly desirable as an actuator for certain applications as it requires no external power source for its operation. In addition, cylinders with an internal spring actuator mechanism which move the piston and its output shaft are commercially available parts. In the alternative, when hydraulic pumps, motors or the like are used as the actuator, their on-off operation is controlled via a sensor 115 and control leads 116.

Shaft 108 may be grooved itself or contain a pin that follows a grooved track in order to cause the catalyst chamber to rotate as the catalyst chamber is displaced in response to operation of the activating mechanism. This allows the catalyst chamber to spin dry as it moves out of contact with the fuel and accelerate the draining of any liquid to prevent precipitation of borate deposits in the catalyst chamber. Additionally, the rotation of the catalyst chamber during descent would stir the solution to ensure homogeneity of the fuel solution. This same rotational capability can be provided to tank 101 in the embodiment shown in FIG. 2 and more fully described hereinbelow.

To provide system 100 with self-regulating hydrogen generating capabilities, actuator 110 in its normal or "first" state positions the catalyst chamber 107 so that its contained catalyst is in contact with the fuel solution in the enclosure formed by walls 102. When the catalyst in catalyst chamber contacts the fuel solution, the reaction shown in Equation 1 occurs to produce hydrogen gas. As hydrogen is generated, the pressure within the enclosure formed by walls 102 rises and a level is reached where this pressure displaces the catalyst chamber, upwardly in FIG. 1, from its first state position to a second state position wherein the catalyst in the catalyst chamber is either no longer in contact with the fuel solution or the surface area of the catalyst in such contact is reduced. We refer to this condition as the "second state" and this pressure is typically between 15 and 25 psi. In the second state, the rate at which hydrogen is generated is lower than that of the first state. If desired, the upward movement of catalyst chamber 107 can be provided by actuator 110 if necessary to completely remove catalyst chamber 107 from contact with the fuel solution. The rate of hydrogen generation in such case will be that provided by the fuel solution in the absence of the catalyst. For most temperature environments of system 100, this hydrogen generation rate is essentially zero. Then, as hydrogen is utilized or conducted away via from the enclosure formed by the walls 102, the pressure within this enclosure will drop and eventually the catalyst chamber will be displaced (downwardly in FIG. 1), so that the catalyst chamber returns to its first state position. This self regulation of the rate of hydrogen generation will continue in this fashion until all active fuel is consumed and no additional hydrogen can be produced. The tank, containing a slurry of sodium metaborate and sodium hydroxide (when the fuel solution includes a sodium hydroxide stabilizer), can be drained and re-charged with fresh fuel as needed.

When springs are used to control the actuator, the pressure of the hydrogen generated with the enclosure formed by walls 102 displaces the catalyst chamber upwardly in FIG. 1 from its first state to its second state thereby also compressing the actuating springs. When the pressure drops to that of the first state, the springs force the catalyst chamber back to its first state position and the rate of hydrogen generation rises to that of the first state. When other actuating mechanisms are used, at least one parameter of the hydrogen generation process can be monitored, e.g., the generated pressure. FIG. 1 shows such this capability through the use of pressure sensor 115 and control leads 116. As this feature is optional, these elements are shown in dotted lines in FIG. 1. Sensor 115 monitors the pressure generated within the enclosure formed by walls 102 and outputs actuator on/off control signals to move the catalyst chamber toward and away from the fuel solution to respectively increase and decrease the rate of hydrogen generation. These control signals are coupled to the actuator via control leads 116.

Figure 2:
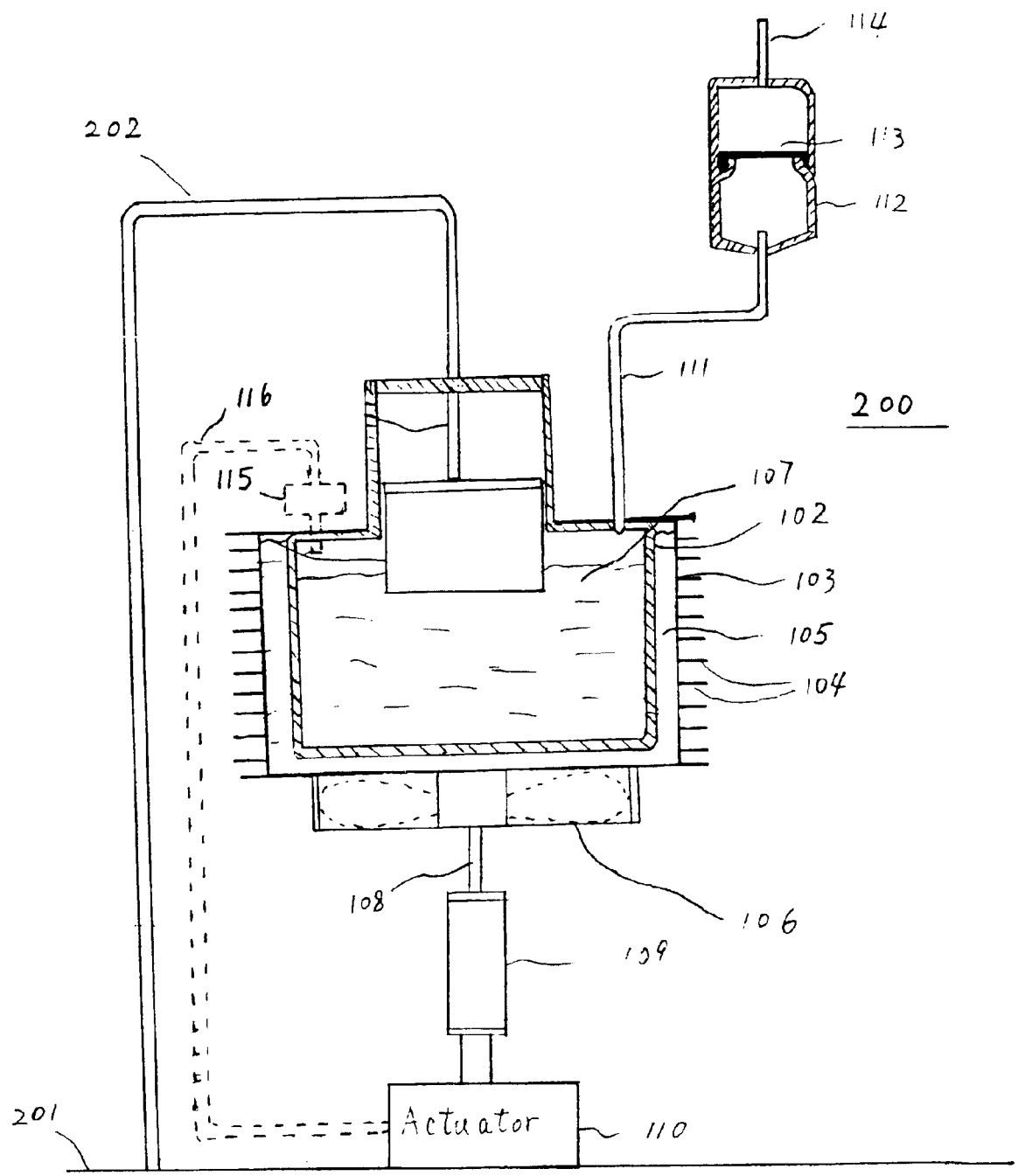
FIG. 2 is an alternative embodiment of a hydrogen generating system in accordance with the present invention.

Refer now to FIG. 2 that shows system 200 in accordance with the present invention. System 200 functions in a very similar manner to that described for system 100 of FIG. 1, except that in system 200, the self regulating mechanism moves the fuel tank toward and away from the fixed catalyst chamber and not vice versa as in system 100. Each of the elements in system 200 that has an identical counterpart in FIG. 1 bears the same reference numeral as such counterpart. As shown in FIG. 2, catalyst chamber 107 is not connected to the actuator mechanism, but instead is fixedly positioned with respect to a reference surface 201 via support member 202. In addition, the piston within cylinder 109 and shaft 108 are again responsive to actuator 110. However, shaft 108 in system 200 is connected to fuel tank 101 instead of catalyst chamber 107 as is the case for system 100. The same types of actuator mechanisms in system 100 may be used in system 200. However, these mechanisms in system 200, in general, must be able to withstand and operate under greater loads than their counterparts in system 100 since, for a given system design, the weight of tank 101 with its fuel solution is generally greater than that of catalyst chamber 107. As hydrogen is generated in system 200 and the pressure within tank 101 increases, actuator 110 will move tank 101 away from catalyst chamber 107 so as to reduce the rate at which hydrogen is generated. Similarly, as the generated hydrogen is consumed and conducted away, this pressure will fall and actuator 110 will move tank 101 toward catalyst chamber 107 so as to increase the rate at which hydrogen is generated.

When the hydrogen generator is not in use, the movable component (either the catalyst chamber or fuel tank) can be locked in the second state position to mechanically prevent movement and contact of the catalyst with the fuel solution. This allows the unit to be depressurized for storage and does not rely on the gas pressure to prevent contact in the "off" condition. This is most useful in applications where the unit will be stored long-term or where a ready supply of hydrogen is not required upon start-up. It may be possibly to bleed off and store this hydrogen in a buffer tank (not shown) to meet any instant demand before the generator is operating. To restart the generator and operate as described, the component is unlocked and allowed to respond to the actuating mechanism.

Advantageously, system 100 and 200 can be fabricated with readily available commercial parts and has only one moving part (the piston), uses readily available materials in its construction and can made of many sizes or shapes, and requires only a low cost membrane (preferably fluoropolymers) to filter the water from the hydrogen gas stream. This generator provides an operationally simple and low maintenance arrangement to produce hydrogen from aqueous fuel solutions. As described it needs no external source of power to start or operate. The design of system 100 or 200 also allows the fuel solution to drain away from the catalyst bed. This is advantageous as the precipitation of borate has been observed to cause clogging of the catalyst bed and fuel lines in some hydrogen generation systems. Further, in the disclosed one-tank static systems, the discharged solution never needs to be circulated during system operation. Any precipitated borate products deposit on the bottom of the tank and have not been observed to interfere with the generation of hydrogen.

System 100 or 200 can also be readily assembled from off-the-shelf components, such as plastic spray bottles. The bottle cap can be equipped with a piston cylinder attached to a small catalyst chamber and then screwed or otherwise affixed to the bottle. The separator 112 with its membrane filter 113 may also be incorporated into the cap assembly where it serves to dry the hydrogen stream. System 100 or 200 is also compatible for use with the technique for drying the spent fuel solution in tank 101 so as to substantially reduce its weight. Specifically, the drying apparatus disclosed in U.S. patent application Ser. No. 10/193,666, entitled "Method And Apparatus For Processing Discharged Fuel Solution From A Hydrogen Generator", filed Jul. 19, 2002 and assigned to the present assignee may by connected to tank 101. Such application is hereby incorporated by reference.

In either system 100 or 200, the fuel tank is filled with a solution of sodium borohydride (preferably ranging from 10 to 30 weight %) and sodium hydroxide (a stabilizer, preferably ranging from 1 to 5 weight %) in water, and the catalyst chamber is positioned within this fuel solution. Alternatively, the fuel solution can contain only water and sodium borohydride, and no additional stabilizing agent. As discussed, the rate of the hydrolysis reaction shown in Equation 1 rapidly decreases with increasing pH, and sodium hydroxide is oftentimes added as a stabilizer to extend shelf life of the liquid fuel. However, basic sodium metaborate, a base, is formed as a product of hydrogen generation and will cause an increase in pH even in the absence of added base. A solution of sodium borohydride could be prepared in this apparatus by addition of water to solid borohydride; the initial hydrogen generated (in the absence of catalyst) would serve to self-start the generator. As the solution pH rises, the rate of hydrogen generation would decrease, and cause the catalyst to contact the solution in normal operation.

Figure 3:
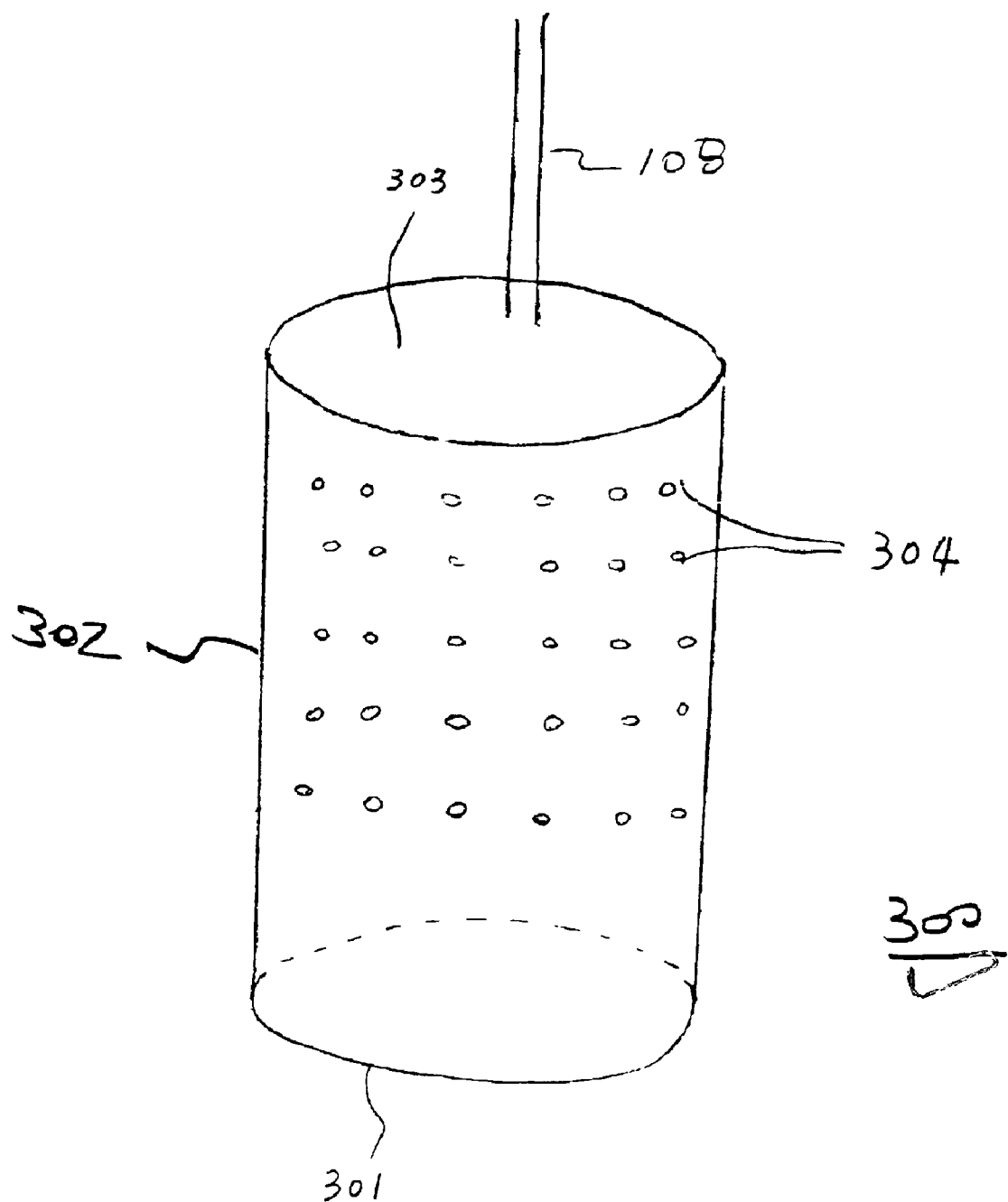
FIG. 3 is one embodiment of a catalyst chamber for use in the systems of FIGS. 1 and 2.

One configuration for a catalyst chamber 300 is shown in FIG. 3. The lower end 301 of a stainless steel tube 302 can be covered with wire mesh to contain the catalyst. The same mesh can also cover the upper end 303 and, in such case, shaft 108 is attached to the chamber by a suitable structure (not shown) that connects to the circumferential tube walls. These walls can advantageously be perforated with holes 304 to provide inlets for the fuel solution to contact the contained catalyst. Alternatively, the catalyst chamber could be entirely constructed from a mesh screen. Additional details on catalyst chambers and containment systems can be found in U.S. patent application Ser. No. 09/979,363, "A System for Hydrogen Generation," filed Jan. 7, 2000, assigned to the present assignee and incorporated herein by reference. In any event, as the catalyst chamber 300 moves downwardly into the fuel solution in system 100 or 200, the area of the tube walls in contact with this solution increases linearly with such movement.

The cylinder could be flattened in a configuration where the radius is much greater than the height so that the catalyst chamber is a disc. In this fashion, the entire surface area of the catalyst would contact the fuel solution at once rather than in proportion to the depth of immersion. In contrast to the catalyst chambers that allow tuning of hydrogen generation by control of the surface area of the catalyst in contact with the fuel solution, the disc imparts an on/off trigger to the system and is suited for applications which require a fixed supply of hydrogen.

Figure 4:
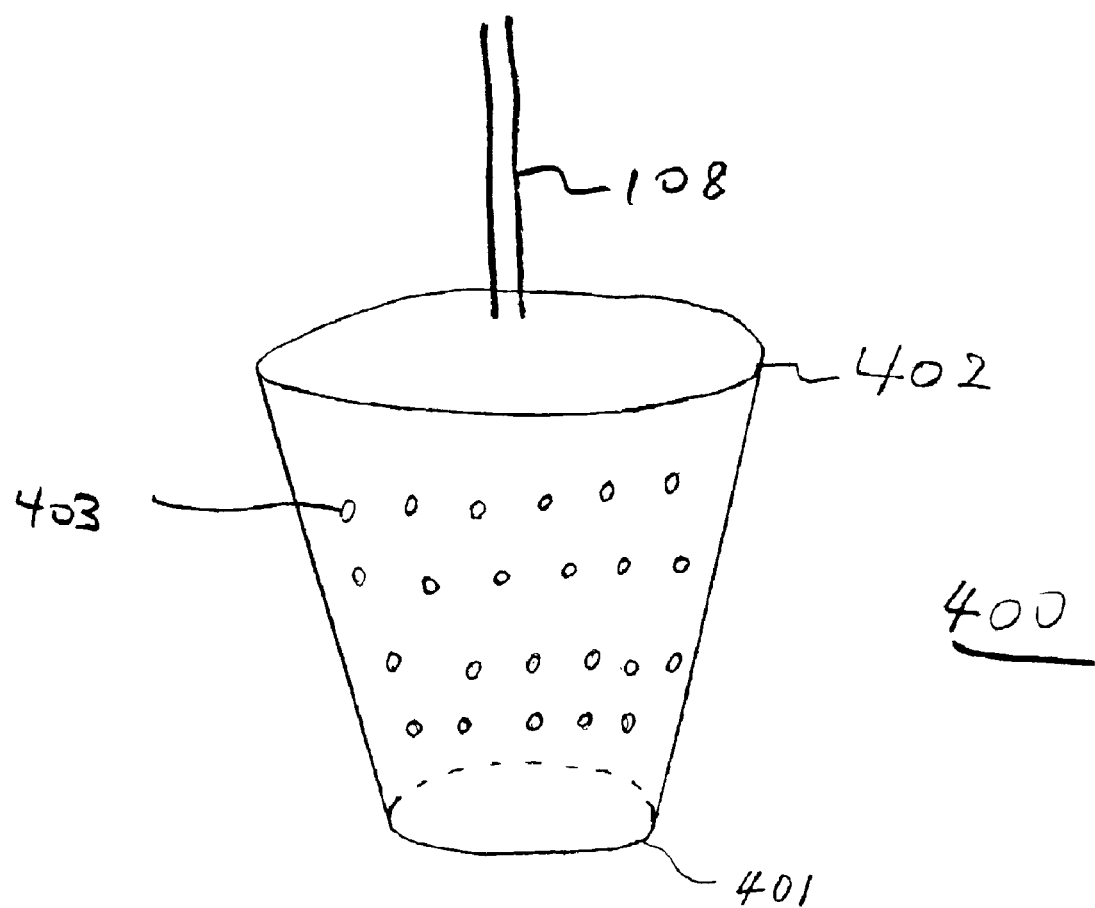
FIG. 4 is another embodiment of a catalyst chamber for use in the systems of FIGS. 1 and 2.

Other conical shapes may be used in catalyst chamber designs. Any of the common geometric solids which come to a point at one end (e.g., cones, pyramids, or triangular prisms) are useful to provide a nonlinear increase in rate of hydrogen generation. As shown in FIG. 4, catalyst chamber 400 has a frusto-conical shape with smaller end 401 and large end 402. Again, these ends can be covered with mesh as described for chamber 300. In addition, holes 403 in the walls increase the surface area of the catalyst in contact with the fuel solution. As shown in FIG. 4, shaft 108 is connected to the larger end 402. As the catalyst chamber 400 moves downwardly into the fuel solution in system 100 or 200, the area of the tube walls in contact with this solution increases nonlinearly with such movement. Alternatively, by connecting end 401 to shaft 108 instead of end 402 as shown in FIG. 4, the area of the tube walls in contact with the fuel solution decreases nonlinearly with such movement.

System 100 with its fuel tank, separator with a fluoropolymer membrane, catalyst chamber, spring-loaded stainless steel cylinder and various sanitary fittings, plastic lines and valves was tested experimentally. The unit was filled with fuel (20 wt % $NaBH_4$ and 3 wt % NaOH in water) and the catalyst (ruthenium bound to and coated on nickel pads) was dropped into the solution. Hydrogen generation was nearly instantaneous and caused the pressure to increase inside the tank. The pressure in the tank remained regulated at between 10 to 15 psi as hydrogen was generated for over an hour.

For fuel cells, the electric current load is proportional to the hydrogen required from the generator. An experiment was conducted with varying flow rates of hydrogen and acceptable load following was observed. The generator exhibited acceptable self-regulation and no over pressure conditions have been observed.

The generator depicted in FIG. 1 was subjected to a repeated use test, running a 35-watt fuel cell under an 11-watt load. The maximum fuel operating temperature during operation never exceeded 36° C. The unit was operated until no more hydrogen was generated from the initial charge of fuel.

For each test shown in the table, the generator was started each day and shut-off overnight without adding new fuel. Thus for Test 1, the unit was operated for approximately 8 to 9 hours a day over a 5 day period without draining or replacing the fuel mixture in the tank. It was of interest to determine if any precipitation of sodium metaborate product in the fuel mixture affected the operation of the unit.

| TEST | TOTAL OPERATING TIME (HRS) | FUEL CHARGE (ML) |
|---|---|---|
| 1 | 44 | 1600 |
| 2 | 38.25 | 1400 |
| 3 | 32.8 | 1400 |

It should, of course, be understood that the disclosed embodiments are merely illustrative of the present invention and should not be considered as limitations upon the scope of the invention. Numerous modifications and alternative embodiments of the invention will be apparent to those skilled in the art in view of the foregoing description. For example, while in the disclosed embodiments, sensor 115, if used, monitors pressure and provides self-regulation of the hydrogen generating system, other system parameters, e.g., temperature or the rate of change of the concentration of metal borohydride in the fuel solution may be monitored and used to provide the self-regulation. Indeed, more than one parameter can be monitored and a plurality of the measurements of such parameters as a function of time used to provide self-regulation.

What is claimed:

1. A method for generating hydrogen comprising the steps of:

providing a chamber holding a fuel solution, said fuel solution generating hydrogen and a discharged fuel solution via a chemical reaction as part of a hydrogen generation process;

providing a catalyst chamber containing a catalyst that accelerates the generation of hydrogen when in contact with said fuel solution, said catalyst chamber being disposed within said chamber; and monitoring at least one parameter of said hydrogen generation process; and providing relative movement between said catalyst chamber and said chamber so as to vary the rate of hydrogen generation by bringing more or less of said catalyst in said catalyst chamber into contact with said fuel solution.

2. A system for generating hydrogen comprising:

a chamber for holding a fuel solution, said fuel solution generating hydrogen via a chemical reaction as part of a hydrogen generation process;

a catalyst chamber containing a catalyst that accelerates the generation of hydrogen when in contact with said fuel solution, said catalyst chamber being disposed within said chamber; and an actuator responsive to at least one parameter of the hydrogen generation process for providing movement of one of said catalyst chamber and said chamber relative to the other one of said catalyst chamber and said chamber, so as to vary the rate of hydrogen generation.

3. The system of claim 1 wherein said actuator includes a spring.

4. The system of claim 1 wherein said actuator includes a motor.

5. The system of claim 1 wherein said actuator includes a pump.

6. The system of claim 1 wherein said chamber is double-walled and includes a material with a high specific heat between the walls.

7. The system of claim 1 wherein said chamber includes fins for enhancing heat dissipation from said chamber.

8. The system of claim 1 further including outlet apparatus for conducting the generated hydrogen from said chamber, said outlet apparatus including a separator which removes moisture from said generated hydrogen.

9. The system of claim 1 wherein said catalyst chamber provides a linear change in the rate of hydrogen generation as more of said catalyst chamber is exposed to said fuel solution.

10. The system of claim 9 wherein said catalyst chamber has a cylindrical shape.

11. The system of claim 10 wherein said catalyst chamber has a rectilinear shape.

12. The system of claim 9 wherein said catalyst chamber is cube-shaped.

13. The system of claim 1 wherein said catalyst chamber is a disk.

14. The system of claim 1 wherein said catalyst chamber provides a nonlinear change in the rate of hydrogen generation as more of said catalyst chamber is exposed to said fuel solution.

15. The system of claim 14 wherein said catalyst chamber has a frusto-conical shape.

16. The system of claim 14 wherein said catalyst chamber is cone-shaped.

17. The system of claim 14 wherein said catalyst chamber is pyramid-shaped.

18. The system of claim 14 wherein said catalyst chamber is triangular prism-shaped.

19. The system of claim 1 wherein said actuator spins a selected one of said catalyst chamber and said chamber as it provides the relative movement.

20. The system of claim 1 wherein said actuator can be locked so as to keep said catalyst chamber and said fuel solution away from one another.

* * * * *